United States Patent
Erez

(10) Patent No.: US 8,234,539 B2
(45) Date of Patent: Jul. 31, 2012

(54) CORRECTION OF ERRORS IN A MEMORY ARRAY

(75) Inventor: Eran Erez, Cupertino, CA (US)

(73) Assignee: SanDisk IL Ltd., Kfar Saba (IL)

( * ) Notice: Subject to any disclaimer, the term of this patent is extended or adjusted under 35 U.S.C. 154(b) by 1271 days.

(21) Appl. No.: 11/951,455

(22) Filed: Dec. 6, 2007

(65) Prior Publication Data

US 2009/0150747 A1    Jun. 11, 2009

(51) Int. Cl.
*H03M 13/00* (2006.01)
(52) U.S. Cl. .......................... 714/755; 714/758
(58) Field of Classification Search .................. None
See application file for complete search history.

(56) References Cited

U.S. PATENT DOCUMENTS

| | | | |
|---|---|---|---|
| 4,712,215 A | 12/1987 | Joshi et al. | |
| 5,233,614 A * | 8/1993 | Singh | 714/723 |
| 5,603,001 A | 2/1997 | Sukegawa et al. | |
| 5,847,577 A | 12/1998 | Trimberger | |
| 6,085,339 A | 7/2000 | Jeddeloh | |
| 6,526,537 B2 | 2/2003 | Kishino | |
| 7,099,997 B2 | 8/2006 | Balazich et al. | |
| 7,810,017 B2 * | 10/2010 | Radke | 714/769 |
| 2005/0172065 A1 | 8/2005 | Keays | |
| 2006/0039196 A1 * | 2/2006 | Gorobets et al. | 365/185.01 |
| 2008/0052015 A1 * | 2/2008 | Ozawa et al. | 702/57 |

* cited by examiner

*Primary Examiner* — Guerrier Merant
(74) *Attorney, Agent, or Firm* — Martine Penilla Group LLP

(57) ABSTRACT

A computer system for correction of errors in a memory array includes an error correction algorithm and a memory. The error correction algorithm is capable of correcting errors up to a first bit error rate in a correctable group of memory cells having a standard size. The memory is operative to store a first set of ECC bits having information corresponding to a first group of memory cells having a first size larger than the standard size, and to store a second set of ECC bits having information corresponding to a second group of memory cells having a second size smaller than said first size and being a portion of said first group. The error correction algorithm is operative to correct errors in the second group based on the second set of ECC bits if a failure occurs in correction of the first group based on the first set of ECC bits.

15 Claims, 4 Drawing Sheets

CORRECTION OF ERRORS IN A MEMORY ARRAY

FIELD OF THE INVENTION

The present invention relates to error correction codes (ECC) for correction of errors in a memory.

BACKGROUND OF THE INVENTION

Non-volatile memory devices and especially solid state memory devices tend to wear out over time. One main effect of such wear is the creation of errors in stored data. Different device types have different typical and industry accepted reliability, depending, for example, on the technology used and on the manufacturing process tolerance which can be achieved. Some flash controllers are designed capable of correcting errors up to a first ("weak") bit error rate (for example up to 6-bits per 512 bytes) in a correctable group of memory cells having a standard size (for example 256 Bytes), while other controllers require a second bit error rate that is higher than the first bit error rate (for example up to 8-bits per 512 bytes) to obtain a stronger protection.

Several error handling schemes have been made in the art to provide a strong bit error rate protection using a weak error handling schemes. One solution is to split the group of memory cells to sub-groups (correctable groups) and to apply the existing, weaker error correction scheme on each sub-group separately. As such, each sub-group is individually protected by a weaker bit error rate. However, such error correction schemes require applying an error correction operation on each one of the sub group, thereby degrading the overall performance.

Another common approach is designing a new, stronger error correction scheme that is capable of correcting errors up to the desired bit error rate. The drawback of a new designed system is high cost affect and the time it takes to design such a system.

Although each of the prior art error handling schemes provides some protection for defective memory locations, none of them are perfect. Some schemes require excessive resource and development time; some degrade the system's overall read performance; and others provide inadequate protection.

SUMMARY OF THE INVENTION

The present invention may be embodied as a computer system having an error correction algorithm for correction of errors in a memory array and a method thereof. Memory cells are stored in the memory array in association with corresponding ECC bits. The ECC bits are generated as follows: one set of ECC bits include information corresponding to a first group of memory cells (the first group has a first size that is larger than or equals to a standard size, for example 256 Bytes); a second set of ECC bits includes information corresponding to a second group of memory cells (the second group is inclusive inside the first group), a third set of ECC bits includes information corresponding to a third group of memory cells (the third group is inclusive inside the second group) and so on. Generating the ECC bits as such provides correction of errors in the memory array, while achieving optimal overall performance.

In one embodiment of the foregoing approach, a method for correcting errors in a memory array may include the step of providing an error correction algorithm which is capable of correcting errors up to a first bit error rate in a correctable group of memory cells. The correctable group has a standard size. The method also includes the steps of generating a first set of ECC bits having information corresponding to a first group of memory cells; generating a second set of ECC bits having information corresponding to a second group of memory cells; and applying the error correction algorithm to correct errors in the first group based on the first set of ECC bits. The first group has a first size larger than the standard size. The second group has a second size smaller than the first size and being a portion of the first group. If the error correction algorithm based on the first set of ECC bits fails, then the method also includes applying the error correction algorithm to correct errors in the second group based on the second set of ECC bits. The method may also include correcting the first group based on the first set of ECC bits. The method may also include correcting the second group based on the second set of ECC bits.

The method may also include generating an additional set of ECC bits having information corresponding to an additional group of memory cells. The additional set of ECC bits may be generated preceding the generation of the error correction algorithm The additional group may have a third size smaller than the second size and being a portion of the second group. If the error correction algorithm based on the second set of ECC bits fails, then the method may include applying the error correction algorithm to correct errors in the additional group based on the additional set of ECC bits. The method may include correcting the additional group based on the additional set of ECC bits. The method may be applied to thereby correct errors up to a second bit error rate in the first group, where the second bit error rate is larger than the first bit error rate.

In another embodiment of the foregoing approach, a computer system for correction of errors in a memory array includes an error correction algorithm that is capable of correcting errors up to a first bit error rate in a correctable group of memory cells. The correctable group has a standard size. A memory is operative to store a first set of ECC bits having information corresponding to a first group of memory cells, and to store a second set of ECC bits having information corresponding to a second group of memory cells. The first group has a first size larger than the standard size and the second group has a second size smaller than the first size and being a portion of the first group. The error correction algorithm is operative to correct errors in the second group based on the second set of ECC bits if the error correction algorithm, which is applied in the first group based on the first set of ECC bits, fails.

The memory may be a flash memory. The error correction algorithm may also be operative to correct the first group based on the first set of ECC bits. The error correction algorithm may also be operative to correct the second group based on the second set of ECC bits.

The memory may be operative to store an additional set of ECC bits having information corresponding to an additional group of memory cells. The additional group has a third size smaller than the second size and being a portion of the second group. The error correction algorithm may be further operative to be applied in the additional group based on the additional ECC bits if the error correction algorithm that is applied in the second group based on the second group of ECC bits fails. The error correction algorithm may be operative to correct the additional group based on the additional set of ECC bits.

The error correction algorithm may be applied to thereby correct errors up to a second bit error rate in the first group, where the second bit error rate is larger than the first bit error rate.

Additional features, advantages and possible variation of the embodiments described will become apparent from the following drawings and description.

BRIEF DESCRIPTION OF THE DRAWINGS

For a better understanding of the invention with regard to the embodiments thereof, reference is made to the accompanying drawings, in which like numerals designate corresponding sections or elements throughout, and in which.

DETAILED DESCRIPTION OF PREFERRED EMBODIMENTS

The invention defined by the claims below will be better understood by referring to the present detailed description of the exemplary and preferred embodiments. This description is not intended to limit the scope of claims but instead to provide examples of such embodiments. The following discussion therefore presents exemplary embodiments, which include a computer system for correcting errors in a memory array and a method thereof.

One embodiment of the computer system employs an error correction algorithm for correction of errors in a memory array. The memory array may include two or more groups of memory cells, where the smallest group of memory cells is inclusive inside the smaller group of memory cells, the smaller group of memory cells is inclusive inside a bigger group, and so on. Each group of memory cells is stored in the memory array in association with a set of ECC bits corresponding to the width and lengths of its group. One set of ECC bits include information corresponding to the first group of memory cells; the other set of ECC bits include information corresponding to the second group of memory cells, and so on. Generating the ECC bits as such provides correction of errors in the memory array, while achieving optimal overall performance.

The error correction algorithm is capable of correcting errors up to a first bit error rate (for example up to 6-bits per 512 bytes) in a correctable group of memory cells having a standard size (for example 256 Bytes). The error correction algorithm is applied to correct the larger group of memory cells first using this group's corresponding ECC bits, and upon failure of this correcting action, the error correction algorithm is applied to correct the smaller group of memory cells. Upon the failure of the smaller group, the error correction algorithm may be further applied to correct an even smaller group of memory cells that is inclusive inside the former group. This correction action may be applied recursively, each time on a smaller group of memory cells based on the corresponding ECC bits, until correction succeeds. Upon success, the data of all the groups of memory cells interrelated in the process are corrected.

Figure 1A:
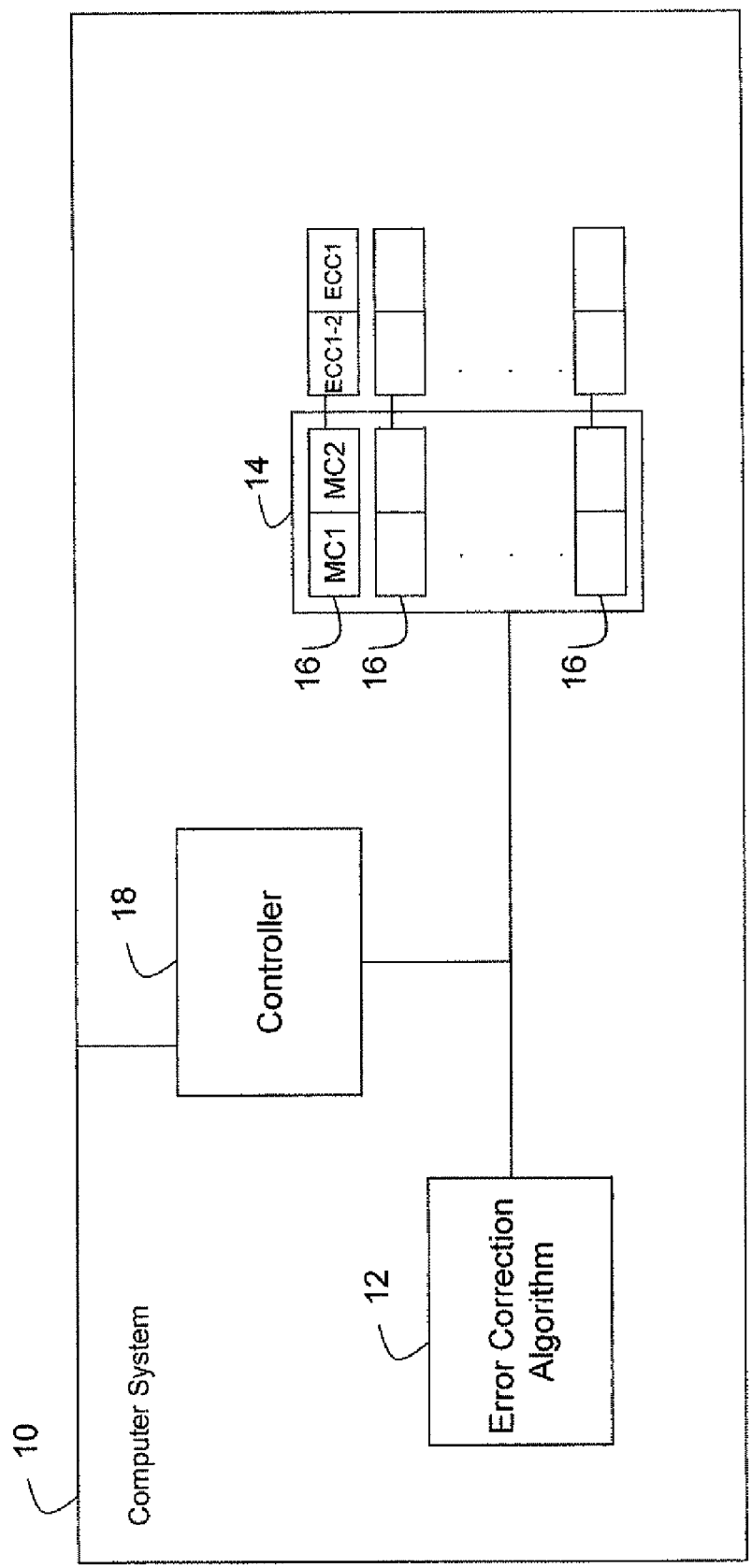
FIG. 1A is a block diagram of an embodiment of a computer system for correction of errors in a memory array.

FIG. 1A is an exemplary embodiment of a computer system 10 having an error correction algorithm 12 for correction of errors in a memory array 14. Memory array 14 may be a flash memory. The error correction algorithm 12 is capable of correcting errors up to a first bit error rate (for example up to 6-bits per 512 bytes) in a correctable group of memory cells (for example MC1) having a standard size (for example 256 Bytes). A controller 18 is provided for writing data to the memory array 14 and for reading the data from the memory array 14.

Memory array 14 includes a plurality of data units 16. Note that a data unit may be related with any number of bytes, including but not limited to 256 bytes, 512 bytes, etc.

In this example, the error correction algorithm 12 is implemented to generate two sets of ECC bits for each data unit 16, as follows: a first set of ECC bits, ECC1-2, having information corresponding to a first group of memory cells MC1 and MC2; and a second set of ECC bits, ECC1, having information corresponding to a second group of memory cells MC1 (Alternatively, the second set of ECC bits may have information corresponding to group of memory cells MC2). The first group of memory cells MC1 and MC2 has a first size (for example 512 Bytes) that is larger than the standard size, The second group of memory cells MC1 has a second size (for example 256 Bytes) that is smaller than the first size. The second group of memory cells MC1 is a portion of the first group MC1 and MC2. The first set ECC1-2 and second set ECC1 of ECC bits are stored in the memory array 14 in association with the respective data unit 16.

Error correction algorithm 12 is operative to correct errors in the first group MC1 and MC2 based on the first set of ECC bits ECC1-2. If this process fails (e.g. there are more than 6 errors in the first group MC1 and MC2), then the error correction algorithm 12 is operative to correct errors in the second group MC1 based on the second set of ECC bits ECC1. In other words, error correction algorithm 12 is operative to correct errors in the second group MC1 based on the second set of ECC bits ECC1 if the error correction algorithm, applied in the first group MC1 and MC2 based on the first set of ECC bits ECC1-2, fails. As such, the error correction algorithm 12 (that is originally implemented to correct up to 6-bit error rate) may be used to thereby correct errors in the first group MC1 and MC2 up to a second bit error rate, for example up to 8-bits per 512 bytes, that is larger than the first bit error rate.

It should be appreciated that various implementations may use a wide range of memory configuration and the particular one illustrated should not be construed as limiting to only that implementation. For example, the sets of ECC bits may be contiguous with the memory cells, the arrangement may be other than in data units and/or various types of error correction algorithms may be provided. The error correction algorithm may be further applied to generate two sets of ECC bits, three sets of ECC bits (see FIG. 1B), or more; and the memory array may be implemented to store the two sets of ECC bits, the three sets of ECC bits or more.

Error correction algorithm 12 may also be operative to correct the first group MC1 and MC2 based on the first set of ECC bits ECC1-2. Alternatively or additionally, error correction algorithm 12 may also be operative to correct the second group MC1 based on the second set of ECC bits ECC1. Memory array 14 may be operative to store an additional set of ECC bits having information corresponding to an additional group of memory cells, where this additional group of memory cells have a third size smaller than the second size and being a portion of the second group MC1. In such case, error correction algorithm 12 is further operative to be applied in the additional group of memory cells based on the additional ECC bits if the error correction algorithm 12 applied in the second group MC1 based on the second group of ECC bits ECC1 fails (see FIG. 1B). Error correction algorithm 12 is also operative to correct the additional group of memory cells based on the additional set of ECC bits.

Figure 1B:
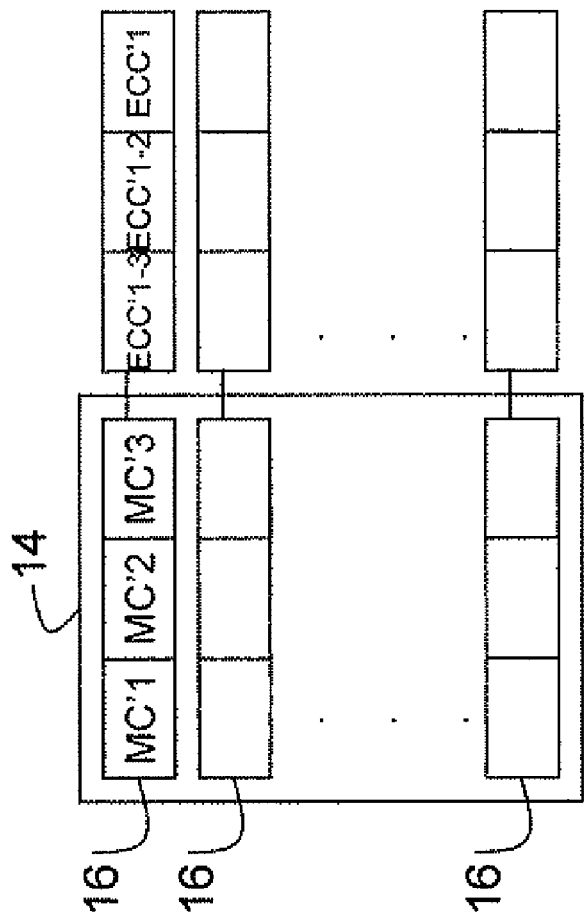
FIG. 1B is a block diagram of the memory array of FIG. 1A, where an error correction algorithm is implemented to generate three sets of ECC bits for each data unit.

FIG. 1B is an exemplary embodiment of the memory array 14 of FIG. 1A, where the error correction algorithm 12 is implemented to generate three sets of ECC bits for each data unit 16. In this example, the error correction algorithm 12 is implemented to generate three sets of ECC bits for each data unit 16, as follows: a first set of ECC bits, ECC'1-3, having information corresponding to a first group of memory cells MC'1, MC'2 and MC'3; a second set of ECC bits, ECC'1-2, having information corresponding to a second group of memory cells MC'1 and MC'2; and a third set of ECC bits, ECC'1, having information corresponding to a third group of memory cells MC'1. The first group of memory cells MC'1, MC'2 and MC'3 has a first size (for example 640 Bytes) that is larger than the standard size. The second group of memory cells MC'1 and MC'2 has a second size that is smaller than the first size. The second group of memory cells MC'1 and MC'2 is a portion of the first group MC'1, MC'2 and MC'3. The third group of memory cells MC'1 has a third size that is smaller than the second size. The third group of memory cells MC'1 is a portion of the second group MC'1 and MC'2. The first set ECC'1-3, the second set ECC'1-2 and the third set ECC'1 of ECC bits are stored in the memory array 14 in association with the respective data unit 16. Error correction algorithm 12 is operative to correct errors in the first group MC'1, MC'2 and MC'3 based on the first set of ECC bits ECC'1-3. If this process fails (e.g. there are more than 6 errors in the first group MC'1, MC'2 and MC'3), then the error correction algorithm 12 is operative to correct errors in the second group MC'1 and MC'2 based on the second set of ECC bits ECC'1-2. Only if this second process fails (e.g. there are more than 6 errors in the second group MC'1 and MC'2), then the error correction algorithm 12 is operative to correct errors in the third group MC'1 based on the third set of ECC bits ECC'1.

Figure 2:
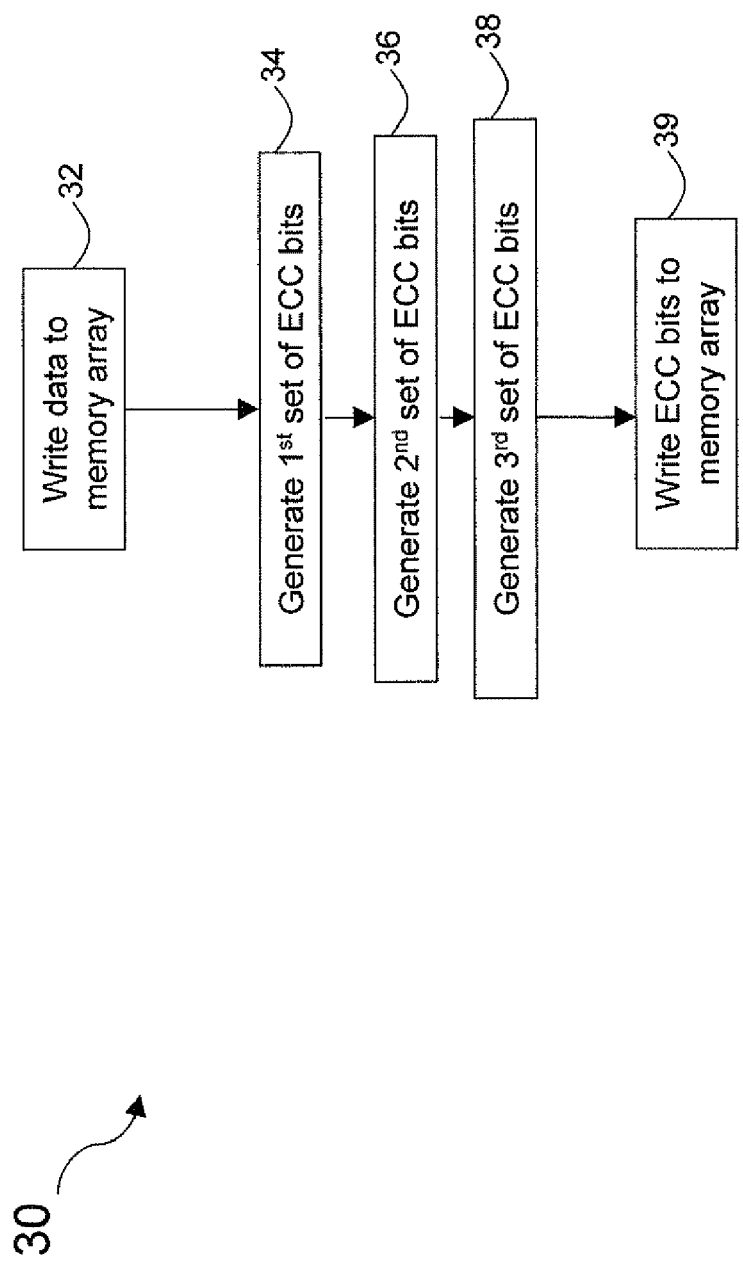
FIG. 2 is a flow chart of writing data to a memory array, in accordance with an exemplary embodiment.

FIG. 2 is a flowchart 30 of a method for writing data to a memory array of computer system 10 having error correction algorithm 12, in accordance with an exemplary embodiment. At 32 data is written to the memory array. The error correction algorithm is capable of correcting errors up to a first bit error rate in a correctable group of memory cells having standard size (for example 256 Bytes). In this example, the error correction algorithm 12 is implemented to generate three sets of ECC bits for each data unit 16.

At 34 a first set of ECC bits ECC'1-3 is generated for the written data. The first set of ECC bits has information corresponding to a first group of memory cells MC'1, MC'2 and MC'3. The first group has a first size (for example 512 Bytes) larger than the standard size.

At 36 a second set of ECC bits ECC1-2 is generated for the written data. The second set of ECC bits has information corresponding to a second group of memory cells MC'1 and MC'2 is generated. The second group has a second size smaller than the first size and is a portion of the first group of memory cells.

At 38 an additional set of ECC bits (in our example, third set ECC'1) is generated for the written data. The additional set of ECC bits has information corresponding to an additional group of memory cells (in our example, third group MC'1). The third group of memory cells has a third size smaller than the second size and being a portion of the second group of memory cells. At 39 the sets of ECC bits are all written to the memory array.

In some embodiments and/or some codes, generation of the first, the second set and the third sets of ECC bits is applied as a single step. In other embodiments, there may be at least two separate steps of generating the first set of ECC bits, the second set of ECC bits and the third set of ECC bits.

Figure 3:
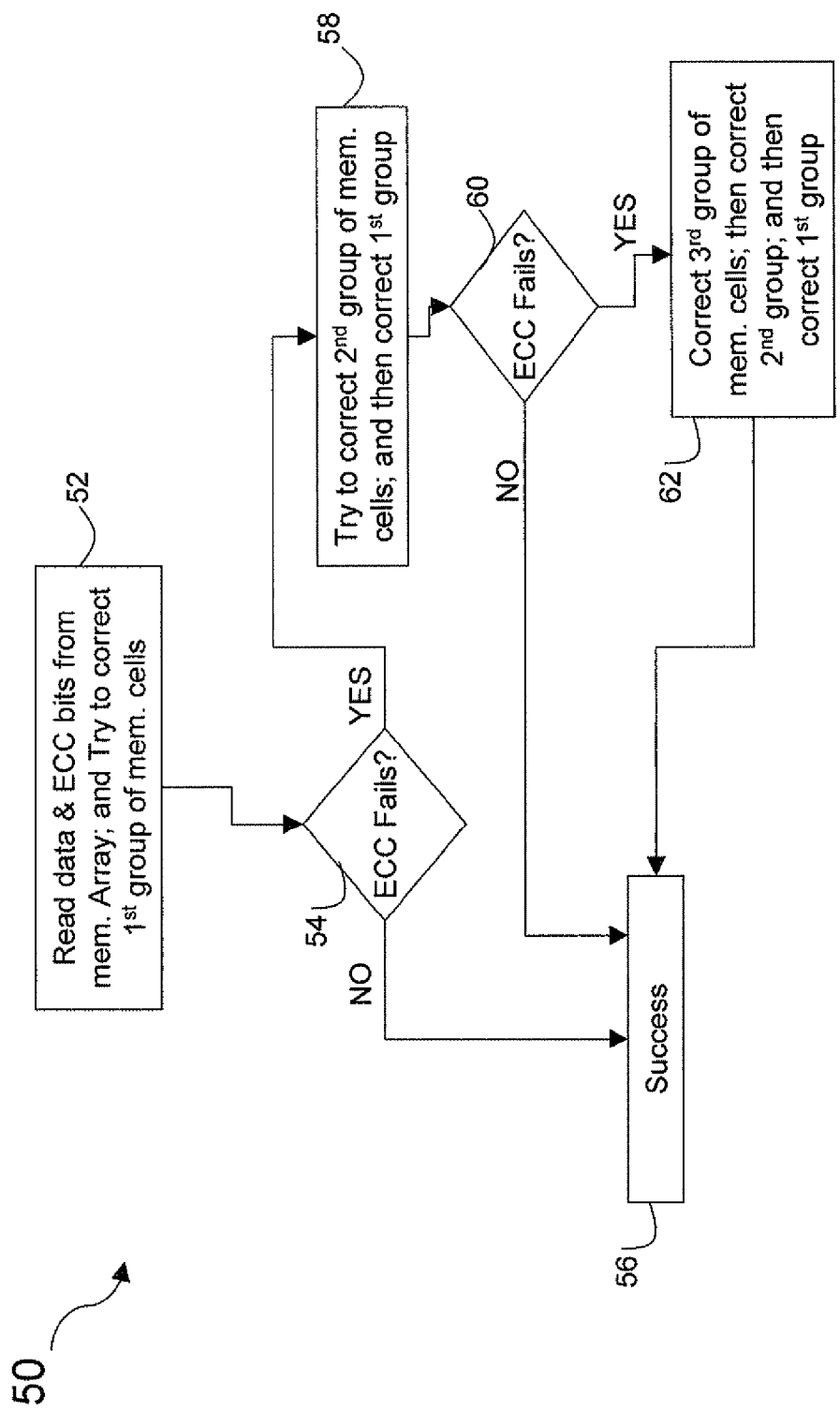
FIG. 3 is a flow chart of reading data from the memory array, in accordance with an exemplary embodiment.

FIG. 3 is a flowchart 50 of a method for reading data from the memory array, in accordance with an exemplary embodiment. At 52 data and its corresponding ECC bits are read from the memory array and the error correction algorithm (of FIG. 2) is applied to correct errors in the first group of memory cells based on the first set of ECC bits.

If the error correction algorithm based on the first set of ECC bits succeeds (54), then the first group of memory cells MC'1, MC'2 and MC'3 is corrected based on the first set of ECC bits ECC'1-3; and a success signal is asserted (step 56). If the error correction algorithm based on the first set of ECC bits fails (54), then the second group of memory cells MC'1 and MC'2 are corrected based on the second set of ECC bits ECC'1-2 (58). If the error correction algorithm based on the second set of ECC bits succeeds (60); then the second group of memory cells MC'1 and MC'2 are corrected based on the second set of ECC bits ECC'1-2; and then the first group of memory cells MC'1, MC'2 and MC'3 are corrected based on the first set of ECC bits ECC'1-3. A success signal is then asserted (step 56). If the error correction algorithm based on the second set of ECC bits fails (60), then the additional group of memory cells MC'1 are corrected based on the additional set of ECC bits ECC'1 (62). At this step (62) the additional group of memory cells MC'1 are corrected based on the additional set of FCC bits ECC'1; then the second group of memory cells MC'1 and MC'2 are corrected based on the second set of ECC bits ECC'1-2; and then the first group of memory cells MC'1, MC'2 and MC'3 are corrected based on the first set of ECC bits ECC'1-3. A success signal is then asserted (step 56).

It should be understood that while the computer system is configured herein with an error correction algorithm applied to generate two or three ECC bits and with a memory array that is implemented to store these sets of ECC bits, the computer system and method are further applicable to generate more than three sets of ECC bits and to store more than three sets of ECC bits. Furthermore, any other types of hubs providing a connection port to mass storage may be employed.

Having described the various embodiments of a system and method, it is to be understood that the description is not meant as a limitation, since further modifications will now suggest themselves to those skilled in the art, and it is intended to cover such modifications as fall within the scope of the appended claims.

The invention claimed is:

1. A method for correcting errors in a memory array, the method comprising:
   (a) providing an error correction algorithm for correcting errors up to a first bit error rate in a correctable group of memory cells, said correctable group having a standard size;
   (b) generating a first set of ECC bits having information corresponding to a first group of memory cells, said first group having a first size larger than the standard size;
   (c) generating a second set of ECC bits having information corresponding to a second group of memory cells, said second group defined from said first group and having a second size smaller than said first size, so that the second group is a portion of said first group;
   (d) applying said error correction algorithm to correct errors in said first group based on said first set of ECC bits;

(e) determining if said error correction algorithm based on said first set of ECC bits fails in step (d); and (f) if said error correction algorithm fails then applying said error correction algorithm to correct errors in said second group based on said second set of ECC bits.

2. The method of claim 1 further comprising:

(f) correcting said first group based on said first set of ECC bits.

3. The method of claim 1 further comprising:

(f) correcting said second group based on said second set of ECC bits.

4. The method of claim 1 further comprising:

(f) preceding said generation of said error correction algorithm in step (d), generating an additional set of ECC bits having information corresponding to an additional group of memory cells, said additional group having a third size smaller than said second size and being a portion of said second group.

5. The method of claim 4 further comprising:

(g) if said error correction algorithm based on said second set of ECC bits fails in step (e), then applying said error correction algorithm to correct errors in said additional group based on said additional set of ECC bits.

6. The method of claim 5 further comprising:

(h) correcting said additional group based on said additional set of ECC bits.

7. The method of claim 1, wherein step (e) is applied to thereby correct errors up to a second bit error rate in said first group, said second bit error rate being larger than the first bit error rate.

8. A computer system for correction of errors in a memory array, the computer system comprising:

an error correction algorithm capable of correcting errors up to a first bit error rate in a correctable group of memory cells, said correctable group having a standard size; and a memory operative to store a first set of ECC bits having information corresponding to a first group of memory cells, and to store a second set of ECC bits having information corresponding to a second group of memory cells, said first group having a first size larger than the standard size and said second group defined from the first group and having a second size smaller than said first size, so that the second group is a portion of said first group;

said error correction algorithm being operative to correct errors in said second group based on said second set of ECC bits if said error correction algorithm, applied in said first group based on a said first set of ECC bits, fails.

9. The computer system of claim 8, wherein said memory is a flash memory.

10. The computer system of claim 8, wherein said error correction algorithm is also operative to correct said first group based on said first set of ECC bits.

11. The computer system of claim 8, wherein said error correction algorithm is also operative to correct said second group based on said second set of ECC bits.

12. The computer system of claim 8, wherein said memory is operative to store an additional set of ECC bits having information corresponding to an additional group of memory cells, said additional group having a third size smaller than said second size and being a portion of said second group.

13. The computer system of claim 12, wherein said error correction algorithm is further operative to be applied in said additional group based on said additional ECC bits if said error correction algorithm applied in said second group based on said second group of ECC bits fails.

14. The computer system of claim 13, wherein said error correction algorithm is also operative to correct said additional group based on said additional set of ECC bits.

15. The computer system of claim 8, wherein said error correction algorithm is applied to thereby correct errors up to a second bit error rate in said first group, said second bit error rate being larger than the first bit error rate.

* * * * *